United States Patent
Madine et al.

(10) Patent No.: US 11,165,526 B2
(45) Date of Patent: Nov. 2, 2021

(54) DETERMINING POSITIONS OF BEACON DEVICES

(71) Applicant: HERE Global B.V., Eindhoven (NL)

(72) Inventors: Simon Madine, Edinburgh (GB); Massimiliano Marcon, Berlin (DE); Aleksi Salo, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 92 days.

(21) Appl. No.: 15/816,781

(22) Filed: Nov. 17, 2017

(65) Prior Publication Data
US 2019/0158202 A1    May 23, 2019

(51) Int. Cl.
  *H04H 60/51* (2008.01)
  *G01S 1/02* (2010.01)
  *G01S 5/02* (2010.01)

(52) U.S. Cl.
CPC .............. *H04H 60/51* (2013.01); *G01S 1/024* (2013.01); *G01S 5/02* (2013.01); *G01S 5/0252* (2013.01); *G01S 2201/07* (2019.08)

(58) Field of Classification Search
CPC ......... H04W 84/12; H04W 4/80; H04W 4/02; H04W 8/005; H04W 12/00503; H04W 80/04; H04W 84/18; H04W 24/02; H04W 36/18; H04W 48/16; H04W 48/18; H04W 4/06; H04W 56/001; H04W 92/18; H04W 16/18; H04W 24/00; H04W 64/00; H04W 72/0453; H04W 12/00516; H04W 88/16; G06Q 20/3278; G06Q 20/347
See application file for complete search history.

(56) References Cited

U.S. PATENT DOCUMENTS

| 9,094,466 | B2 | 7/2015 | Alam |
| 9,629,117 | B2 | 4/2017 | Bajko |
| 9,668,233 | B1 | 5/2017 | Horner et al. |
| 2012/0088519 | A1 | 4/2012 | Agardh et al. |

(Continued)

FOREIGN PATENT DOCUMENTS

WO    WO 2015/150344 A1    10/2015

OTHER PUBLICATIONS

Jamâa, M. B. et al., *EasyLoc: RSS-Based Localization Made Easy*, Procedia Computer Science 10 (2012) 1127-1133.

*Primary Examiner* — Yuwen Pan
*Assistant Examiner* — Jing Gao
(74) *Attorney, Agent, or Firm* — Alston & Bird LLP

(57) ABSTRACT

A method is disclosed comprising: scanning for one or more signals sent by one or more beacon devices, wherein each signal of the one or more signals comprises an identifier of the beacon device, which has sent the signal of the one or more signals, wherein one or more identifiers of the one or more beacon devices are determined based on the one or more signals of the one or more beacon devices; obtaining a position information representing the position of the at least one first apparatus; and outputting a report information comprising the determined one or more identifiers of the one or more beacon devices and the position information of the at least one first apparatus to allow usage of the outputted report information to determine the position of at least one of the one or more beacon devices. A corresponding apparatus, computer program and system are also provided.

21 Claims, 6 Drawing Sheets

(56) References Cited

U.S. PATENT DOCUMENTS

| | | | |
|---|---|---|---|
| 2013/0331118 A1* | 12/2013 | Chhabra et al. | H04W 52/0229 |
| | | | 455/456.1 |
| 2014/0269645 A1 | 8/2014 | Do | |
| 2015/0257104 A1* | 9/2015 | Choi | H04W 52/0229 |
| | | | 455/41.3 |
| 2015/0334534 A1 | 11/2015 | Babu et al. | |
| 2016/0219408 A1* | 7/2016 | Yang | H04W 52/0241 |
| 2018/0077535 A1* | 3/2018 | Todeschini | H04W 4/04 |

* cited by examiner

DETERMINING POSITIONS OF BEACON DEVICES

FIELD

The following disclosure relates to the field of indoor positioning, and more particularly relates to systems, apparatuses, and methods for determining a position of a beacon device, such as a low-capability device.

BACKGROUND

Known indoor positioning solutions using e.g. radio maps require that the device to be positioned actively communicates with another device that provides the indoor positioning service, or the device needs to have an in-built radio map and processing power to locally derive its position. This is not possible with beacon devices comprising low-capability hardware, which may lack connectivity, energy, processing resources, or a combination thereof.

SUMMARY OF SOME EXEMPLARY EMBODIMENTS

Beacon devices with low-capability hardware—also referred to as low-capability devices—may be limited to a one-way communication, e.g. via a broadcasting of information. Since the number of such beacon devices is increasing, there are interesting use cases requiring a position of such a beacon device, in particular in indoor positioning scenarios, to be determined. It is thus, inter alia, an object of the invention to achieve a solution to determine the position of such beacon devices.

According to a first exemplary aspect of the present invention, a method is disclosed, performed and/or controlled by at least one first apparatus, the method comprising:
  scanning for one or more signals sent by one or more beacon devices, wherein each signal of the one or more signals comprises an identifier of the beacon device, which has sent the signal of the one or more signals, wherein one or more identifiers of the one or more beacon devices are determined based on the one or more signals of the one or more beacon devices;
  obtaining a position information representing the position of the at least one first apparatus; and
  outputting a report information comprising the determined one or more identifiers of the one or more beacon devices and the position information of the at least one first apparatus to allow usage of the outputted report information to determine the position of at least one of the one or more beacon devices.

This method may for instance be performed and/or controlled by an apparatus, for instance a gateway device of the present invention.

According to a further exemplary aspect of the invention, a computer program is disclosed, the computer program when executed by a processor causing an apparatus, for instance a gateway device, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus (e.g. the first apparatus) is disclosed, configured to perform and/or control or comprising respective means for performing and/or controlling the method according to the first exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect of the present invention.

The above-disclosed apparatus according to any aspect of the invention may be a module or a component for a device, for example a chip. Alternatively, the disclosed apparatus according to any aspect of the invention may be a device, for instance a gateway device. The disclosed apparatus according to any aspect of the invention may comprise only the disclosed components, for instance means, processor, memory, or may further comprise one or more additional components.

According to a second exemplary aspect of the present invention, a method is disclosed, performed and/or controlled by at least one second apparatus, the method comprising:
  obtaining a report information, or a report information and at least one further report information, wherein the report information or the report information and the at least one further report information respectively comprise one or more identifiers and/or one more further identifiers of one or more beacon devices and a position information or a device identifier of a device that provided the report information and/or the at least one further report information;
  determining a position information associated with the report information and/or with the further report information in case the report information and/or the further report information do not comprise such a position information, wherein the position information is determined based at least partially on the device identifier and/or the further device identifier comprised by the obtained report information and/or the obtained further report information; and
  determining a position of at least one of the one or more beacon devices based at least partially on the one or more identifiers and/or the one or more further identifiers of the one or more beacon devices and the position information comprised by the obtained report information and/or by the obtained further report information and/or the determined position information.

This method may for instance be performed and/or controlled by an apparatus, for instance a server. Alternatively, this method may for instance be performed and/or controlled by more than one apparatus, e.g. a server cloud. Alternatively, this method may for instance be performed and/or controlled by a gateway device.

According to a further exemplary aspect of the invention, a computer program is disclosed, the computer program when executed by a processor causing an apparatus, for instance a server, or a gateway device, to perform and/or control the actions of the method according to the second exemplary aspect of the present invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus (e.g. the second apparatus) is disclosed, configured to perform and/or control or comprising respective means for performing and/or controlling the method according to the second exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect of the present invention.

The above-disclosed apparatus according to any aspect of the invention may be a module or a component for a device, for example a chip. Alternatively, the disclosed apparatus according to any aspect of the invention may be a device, for instance a server or server cloud, or a gateway device. The disclosed apparatus according to any aspect of the invention may comprise only the disclosed components, for instance means, processor, memory, or may further comprise one or more additional components.

According to a further exemplary aspect of the invention, a system is disclosed, comprising:
at least one first apparatus according to the first exemplary aspect of the present invention as disclosed above, and at least one second apparatus according to the second exemplary aspect of the present invention as disclosed above.

The at least one first apparatus and the at least one second apparatus may be configured to perform and/or control the method according to the first and/or second exemplary aspect of the present invention.

In the following, exemplary features and exemplary embodiments of all aspects of the present invention will be described in further detail.

A beacon device of the one or more beacon devices may for instance be an electronic device, in particular capable of transmitting information comprising an identifier. Such an electronic device may for instance be a low-capability device (e.g. a tag-device). Such a low-capability device may for instance comprise a transmitter for transmitting (e.g. broadcasting) one or more signals. Such a low-capability device may for instance comprise or be connectable to a transmitter, e.g. according to wireless local area networks (WLAN), to Bluetooth (BT) or to Bluetooth Low Energy (BLE) communication standard. Further, such a low-capability device may for instance comprise a memory, wherein stored information of the memory may for instance be transmitted. Further, such a low-capability device may for instance not comprise a receiver. Thus, the low-capability device may for instance not be able to receive signals. The low-capability device may for instance comprise processing means, e.g. a processor that enables the low-capability device to transmit stored information of the memory. The processing means may for instance not enable the low-capability device to process information, e.g. determining information, generating information, or the like, which demand more processing power than the transmitting of information stored in the memory.

The first apparatus may for instance be a gateway device. Alternatively, the first apparatus may for instance be a central device. Such a gateway device, or such a central device may for instance be represented by a radio node, e.g. usable for indoor positioning and/or floor detection, e.g. according to BT—(Bluetooth) and/or BLE—(Bluetooth Low Energy) specification, or may for instance be a Wi-Fi Access Point for indoor positioning and/or floor detection, e.g. according to the WLAN—(Wireless Local Area Network) specification). The first apparatus may for instance be a mobile device (e.g. smartphone, tablet, wearable (e.g. a smartwatch), or the like to name but a few non-limiting examples). Such a mobile device may for instance act as a gateway device. Such a mobile device may for instance comprise or be connectable to one or more radio transceiver for enabling e.g. connection to and communication via cellular networks and/or WLAN and/or BT and/or BLE connection. Further, such a mobile device may for instance be capable of scanning for one or more signals of one or more beacon devices (e.g. using WLAN and/or BT and/or BLE transceivers) while using simultaneously data enabled cellular or WLAN connection (e.g. using cellular radio or WLAN transceiver). Such a mobile device may for instance comprise system resources sufficient e.g. to determine its own position based on a radio map and/or to obtain its own position, e.g. via a (cloud) positioning service, e.g. provided by a positioning server.

The first apparatus may for instance be used for indoor positioning and/or floor detection, e.g. according to BT—(Bluetooth) and/or BLE—(Bluetooth Low Energy) specification, or may for instance be a Wi-Fi Access Point for indoor positioning and/or floor detection, e.g. according to the WLAN—(Wireless Local Area Network) specification. The first apparatus may for instance comprise or be connectable to a transceiver, e.g. according to the BT-, BLE, and/or WLAN-specification to provide wireless-based communication. The first apparatus may for instance use such a transceiver for transmitting and/or receiving one or more signals, e.g. comprising one or more information. In particular, the first apparatus may for instance use such a transceiver for the scanning of the one or more signals sent by the one or more beacon devices, and/or for outputting the report information.

The first apparatus may for instance be comprised by a venue, e.g. by an infrastructure of the venue. Such a venue may for instance be a building, shopping mall, office complex, public accessible location (e.g. station, airport, university or the like), to name but a few non-limiting examples.

The scanning may for instance be performed by observing one or more communication channels (e.g. pre-determined communication channels), which may be used for the transmission of the one or more signals sent by the one or more beacon devices. The one or more communication channels may for instance be pre-determined according to a communication standard (e.g. WiFi-, BT-, and/or BLE-communication standard) used by the one or more beacon devices. The one or more signals may for instance be broadcasted by the one or more beacon devices. The scanning may for instance be a monitoring for the one or more signals broadcasted by the one or more beacon devices. The broadcasting of the one or more signals by the one or more beacon devices may for instance not require a pairing or establishing of a communication connection between the one or more beacon devices and the first apparatus. For instance, the one or more beacon devices may simply broadcast one or more signals, regardless whether or not the first apparatus is able to scan (e.g. receive) the broadcasted one or more signals.

The position information is obtained, e.g. by determining the position of the first apparatus (e.g. in the venue). The position information may for instance be represented by coordinates (e.g. latitude-, longitude-, optionally altitude-, or x-, y-, optionally z-coordinates), or by a device identifier of the first apparatus. The device identifier of the first apparatus may for instance enable the position represented by coordinates of the first apparatus to be determined, e.g. by a look-up table stored in memory, to name but one non-limiting example.

Alternatively, instead of determining the position information, it may for instance be checked whether or not the (obtained) report information comprises a report information. In case the report information comprises such a position information, it may for instance be obsolete respectively be not necessary to determine the position information.

In an exemplary embodiment according to the first exemplary aspect of the present invention, the step of determining the position information may for instance not take place in case it may be pre-defined that the report information does not comprise a position information.

Prior to outputting the report information, such a report information may for instance be generated, e.g. by the first apparatus. The report information may then—after the generating of the report information—comprise the one or more identifiers of the one or more beacon devices and the position information representing the position of the first apparatus.

The report information is then output, e.g. to one or more further first apparatuses (e.g. one or more gateway devices), to the second apparatus (e.g. a server), or to another apparatus that transfers the report information to the one or more further first apparatuses, to the second apparatus. The report information may further be output to a plurality of apparatuses, e.g. one or more further first apparatuses, one or more second apparatuses, one or more other apparatuses that transfer the report information as described above, or a combination thereof.

According to an exemplary embodiment of all aspects of the present invention, the position information is obtained by determining the position of the first apparatus based at least partially on WiFi-based positioning, and/or GPS-based positioning. It will be understood that GPS-based positioning may for instance be limited when used in a venue. Further, the position information may for instance be obtained by determining the position of the first apparatus based at least partially on a radio map.

For instance, a radio map (e.g. of the venue) may be generated prior to the determining of the position information. Such a radio map may for instance be generated based on fingerprints obtained and/or gathered. Based on the one or more signals scanned (e.g. measured) by the first apparatus, the position of the first apparatus may be determined. One or more identifiers of the one or more beacon devices may for instance be extracted out of the one or more scanned signals. The radio map may for instance comprise information indicative of at which position respectively location (e.g. in the venue) a certain (e.g. combination) of identifiers of the beacon devices can be observed. Then, the radio map may for instance be evaluated taking account of data stored in radio maps and the identifiers of the beacon devices that are extracted out of the scanned signals, and returns a position (e.g. in the form of coordinates) that are consistent with the extracted identifiers of the beacon devices.

Further, the position information may for instance be determined by a triangular direction finding process. The position of the first apparatus may for instance be determined based on signals from e.g. further first apparatuses (e.g. radio nodes), wherein the position of said further first apparatuses may for instance be known. The further first apparatuses may for instance transmit further signals, which are receivable by the first apparatus. Then, the position of the first apparatus may for instance be determined via a triangulation based on the known positions of the further first apparatuses, and the further signals that are receivable at the location of the first apparatus.

According to an exemplary embodiment of all aspects of the present invention, the position information is obtained from a memory.

The position information may for instance be determined by obtaining the position information representing the position of the first apparatus from the memory. The memory may for instance be comprised by a database. The memory may for instance store the position information, or the memory may store a link to the position information. Via the link, the position information may be obtained. Further, the memory may for instance comprise an association of the position information with e.g. a device identifier indicative of an identification of the first apparatus. Via the device identifier, the position information associated with the device that corresponds to the position of the first apparatus may for instance be obtained. In this case, the position of the first apparatus may for instance be not variable, e.g. the first apparatus is a stationary device. In case the first apparatus is a mobile device, the position information may for instance be determinable only in case the position information stored in the memory is kept up-to-date. For instance, the position information stored in the memory may be kept up-to-date by regularly entering the current position of the first apparatus, e.g. manually.

According to an exemplary embodiment of the first exemplary aspect of the present invention, the method further comprises:

obtaining at least one further report information comprising one or more further identifiers identifying the one or more beacon devices, and a device identifier or a further position information of a device that provided the at least one further report information.

The device that provided the at least one further report information may for instance be another first apparatus (e.g. a radio node, e.g. a central device, or a gateway device).

At least one further report information may for instance be obtained by receiving the at least one further report information, e.g. from at least one further apparatus (e.g. another first apparatus). The at least one further report information comprises one or more further identities (e.g. beacon device identities), which may for instance be determined based on one or more signals of the one or more beacon devices that are scanned, e.g. by the at least one further apparatus (e.g. another first apparatus).

In this way, one or more first apparatuses (e.g. gateway devices) may for instance provide each other report information, wherein each report information of the provided report information comprises one or more identifiers of the one or more beacon devices and a device identifier of the first apparatus of the one or more first apparatuses. Thus, taking into account some or all of the provided report information, one or more beacon devices may for instance be determined, which may be observable (e.g. receivable by the scanning) by more than one of the one or more first apparatuses.

According to an exemplary embodiment of the first exemplary aspect of the present invention, in case the at least one further report information does not comprise the further position information, the method further comprises:

determining a position information for the device that provided the at least one further report information based at least partially on the device identifier.

The further report information may for instance comprise a position information representing the position of the device that provided the at least one further report information (e.g. in the venue). In case the further report information does not comprise such a position information, the position information of the device that provided the at least one further report information may for instance be determined based at least partially on the device identifier, wherein the device identifier is comprised by the further report information.

As described above, the position information of the device that provided the at least one further report information may for instance be determined by obtaining the position information representing the position of the device that provided the at least one further report information from a memory. The memory may for instance be the same memory as described above. The memory may for instance be comprised by a database. The memory may for instance store the position information, or the memory may store a link to the position information. Via the link, the position information may be obtained. Further, the memory may for instance comprise an association of the position information with e.g. a device identifier indicative of an identification of the device that provided the at least one further report information. Via the device identifier, the position information associated with the device identifier that corresponds to the position of the device that provided the at least one further report information may for instance be obtained.

According to an exemplary embodiment of the first exemplary aspect of the present invention, the method further comprises:

determining a position of at least one of the one or more beacon devices based at least partially on the one or more identifiers and/or the one or more further identifiers of the one or more beacon devices and the position information representing the position of the first apparatus and/or the position information of the device that provided the at least one further report information.

The position information representing the position of the first apparatus and/or the position information of the device that provided the at least one further report information may for instance be the position information that was determined based on an identifier of the first apparatus, or may for instance be comprised by the obtained report information and/or the obtained at least one further report information.

The one or more identifiers and/or the one or more further identifiers of the one or more beacon devices and the position information representing the position of the first apparatus and/or the position information of the device that provided the at least one further report information can be used to determine the position of at least one of the one or more beacon devices. For instance, it may be analyzed which device (among the first apparatus and the one or more further devices that provided the at least one further report information) has observed (by performing a respective scanning) the at least one beacon device of the one or more beacon devices. Then, the respective position (e.g. in the venue) of the first apparatus and/or of the one or more further devices that provided the at least one further report information and that have observed the at least one beacon device by having scanned one or more signals of the at least one beacon device comprising the identifier of the at least one beacon device of the one or more beacon devices may for instance be used to determine the position of the at least one beacon device of the one or more beacon devices, e.g. by a triangulation or based on a radio map.

Additionally, a plurality of further report information may for instance be obtained and for every further device that provided one of the plurality of further report information a position information representing the position of the device that provided the further report information is obtained, or determined. It will be understood that the position information is only determined in case the position information is not comprised by the provided further report information. In the alternative, the position information may for instance be comprised by the further report information that is provided. In this way, for every further report information, the position of the device that provided the further report information is known, either by being comprised by the further report information or be being determinable based on a device identifier comprised by the further report information.

Further, each further report information of the one or more further report information comprises one or more identifiers of beacon devices that are observable at the position of the device that provided the further report information.

It will be understood, that one or more identifiers of the beacon devices that are determined based on the scanning, may be considered as well when determining the position of the at least one of the one or more beacon devices, e.g. by the triangulation.

According to an exemplary embodiment of all aspects of the present invention, the scanning is performed for the duration of a pre-defined or determined according to pre-defined rule time interval.

The time interval may also be referred to as time window. The one or more signals may for instance be sent periodically by the one or more beacon devices. For instance, the frequency at which the one or more signals may be sent periodically by the one or more beacon devices may be once every 1, 2, or 3 seconds, or once every 0.1 to 0.9, in particular once every 0.2 to 0.5, or once every 0.3 to 0.4 seconds. The same applies to the one or more signals sent by the one or more beacon devices that are used for determining the one or more further identifiers.

The time interval during which the scanning is performed, or during which the scanning of the one or more signals that are used for determining the one or more further identifiers that are obtained as being comprised by the at least one further report information may be limited. Further, the time interval may for instance be equal for the scanning, e.g. performed by the first apparatus, and the scanning of the one or more signals that are used for determining the one or more further identifiers that are obtained as being comprised by the at least one further report information, e.g. performed by at least one further first apparatus. In this way, at least one beacon device of the one or more beacon devices may for instance be comprised in more than one further report information that are obtained and/or the report information outputted by the first apparatus.

In case the time interval is too short, the identifier of the at least one beacon device of the one or more beacon devices may only be comprised by a single report information, that is obtained as a further report information, e.g. from a further first apparatus (e.g. a gateway device), or may not be comprised by such a report information at all. Then, the determining of the position of the at least one beacon device of the one or more beacon devices may for instance be highly inaccurate, or not possible at all in case the identifier of the at least one beacon device of the one or more beacon devices is not comprised by any report information of the obtained report information and/or of the obtained one or more further report information.

In case the time interval is too long (e.g. the time interval is significantly larger than the inverse of the frequency at which the one or more signals of the one or more beacon devices are sent and that are scanned), the identifier of the at least one beacon device of the one or more beacon devices may be comprised by too many obtained further report information, e.g. in case the at least one beacon device is a moving device. This may lead to contradictory results of the determining of the position of the at least one beacon device of the one or more beacon devices. The determining of the position of the at least one beacon device of the one or more beacon devices may for instance be highly inaccurate as well.

In particular, to provide an accurate position of the at least one beacon device of the one or more beacon devices as a result of the determining of the positon of the at least one beacon device of the one or more beacon devices, the time interval is pre-determined or determined according to a pre-defined rule. Such a time interval determined according to a pre-defined rule may for instance be a function to determine the time interval duration delivering the most accurate results, e.g. one or more iterations of e.g. training cases may for instance be performed, e.g. starting from a short time interval (e.g. about 1 second) and increasing or decreasing the duration of the time interval step by step, e.g. to a longer or shorter time interval dependent upon whether or not the accuracy of the determining of the position of the at least one beacon device of the one or more beacon devices has improved. Then, it may be analyzed which duration of the time interval provides the most accurate results.

According to an exemplary embodiment of all aspects of the present invention, the time interval is determined based on a function of a frequency at which the one or more signals of the one or more beacon devices are sent and a speed of movement of the at least one beacon device of the one or more beacon devices whose position is to be determined.

The frequency at which the one or more signals of the one or more beacon devices are sent may for instance be set to be periodic, as described (e.g. defined) above.

The speed of movement of the at least one beacon device of the one or more beacon devices whose position is to be determined may for instance be set based on historical results, and/or may for instance be set according to a use case at hand. For instance, in case the at least one beacon device is carried by a user, the speed of movement may for instance be an average speed of the user moving together with the at least one beacon device.

The time interval may for instance be determined based on the function e.g. in a calibration phase. Such a calibration phase may for instance be performed and/or controlled prior to performing and/or controlling the method according to all aspects of the present invention. For instance, in order to determine an optimum for the duration (length) of the time interval, e.g. without knowing the frequency at which the one or more signals of the one or more beacon devices are sent, the calibration phase may for instance start by arbitrarily selecting a first time interval (e.g. of predetermined duration, e.g. 1 second). Then, the scanning is performed, further report information of further first apparatuses may be obtained, and the position of the at least one beacon device may be determined. The result may for instance be stored in a memory. After that, the duration of the time interval may for instance be increased, e.g. by an pre-defined or dynamically determined amount, e.g. set to a duration of 1.2 seconds, and the steps for determining the position of the at least one beacon device are performed and/or controlled again. The determined position may for instance then be compared to the previously determined position of the at least one beacon device. In case the determined position of the at least one beacon device is closer to the actual position of the at least one beacon device (e.g. in the calibration phase such an actual position of the at least one beacon device that is used during the calibration phase may be known), the accuracy is better due to the changed duration of the time interval than the accuracy provided by the previous duration of the time interval. This procedure of the calibration phase may for instance be repeated any number of times, but it may only be necessary to repeat enough to determine whether or not the accuracy has improved. In case the accuracy has not improved (e.g. the accuracy has degraded), the time interval duration may for instance be decreased, e.g. reduced by a pre-determined or dynamically determined value, e.g. set to a duration of 0.8 seconds, and the position of the at least one beacon device that is used during the calibration phase is determined again. Similarly, if the accuracy has improved, the duration of the time interval may be further increased (e.g. set to a duration of 1.4 seconds) until the accuracy degrades.

Such a calibration phase may for instance be further performed and/or controlled periodically, e.g. during an operation of a system according to all aspects of the present invention, to keep the system up-to-date and optimal.

According to an exemplary embodiment of all aspects of the present invention, one or more received signal strength values are determined based on the one or more signals of the one or more beacon devices, wherein the report information to be outputted and/or the obtained at least one further report information comprises the one or more determined received signal strength values.

The one or more received signal strength values may for instance be determined based on the one or more signals sent by the one or more beacon devices.

In case the one or more received signal strength values are determined, the determined one or more received signal strength values are comprised by the outputted report information and/or by the obtained at least one further report information.

According to an exemplary embodiment of all aspects of the present invention, the method further comprises:

determining reciprocal one or more received signal strength values based on the one or more received signal strength values, wherein each reciprocal received signal strength value of the determined reciprocal one or more received signal strength values is indicative of a received signal strength value observable at the position of at least one of the one or more beacon devices; and wherein the position of at least one of the one or more beacon devices is determined further based on the reciprocal one or more received signal strength values.

The reciprocal one or more received signal strength values may for instance represent received signal strength values as if these received signal strength values would be determined by the at least one beacon device when receiving a signal from the first apparatus, or the further devices that provided the at least one further report information. Due to the distribution of the one or more signals sent by the one or more beacon device, determining the one or more received signal strength values at the receiver (the first apparatus and/or the device that provided the at least one further report information) and determining reciprocal the one or more received signal strength values corresponds to one or more received signal strength values as if such one or more received signal strength values would be determined at the at least one beacon device of the one or more beacon devices.

The position of the at least one beacon device of the one or more beacon devices is determined based at least partially on the reciprocal one or more received signal strength values. Thus, the position of the at least one beacon device of the one or more beacon devices is determined based on the identifiers of the scanned one or more signals of the beacon device, and additionally the received signal strength value and the received identifiers and their corresponding received signal strength values of at least one further report information. The determining of the position of at least one of the one or more beacon devices may for instance be more accurate, in case said position is determined further based on such one or more received signal strength values.

The reciprocal one or more received signal strength values may for instance be determined to correspond to the one or more received signal strength values. Such a correspondence of the one or more received signal strength values may for instance work under the assumption that a signal path of transmitted (e.g. sent) signals in free space will be subject to a symmetrical signal strength loss. For instance, a beacon device and the at least one first apparatus (e.g. a gateway device) both transmit at a known signal strength, (e.g. −10 dBm). If a signal of such a beacon device is received at a gateway device, e.g. with −40 dBm, the assumption is that if this gateway device were to send that signal at −10 dBm, the beacon device would receive the signal also at −40 dBm, given that the path loss is symmetrical.

According to an exemplary embodiment of all exemplary aspects of the present invention, each identifier of the one or more identifiers and/or each further identifier of the one or more further identifiers of the one or more beacon devices is a MAC address and/or the first apparatus is identified based on a MAC address and/or the device identifier of the device that provided the at least one further report information is a MAC address.

According to an exemplary embodiment of the first exemplary aspect of the present invention, the first apparatus is a gateway device capable of performing and/or controlling the method according to the first exemplary aspect of the present invention.

According to an exemplary embodiment of the second exemplary aspect of the present invention, the report information and/or the at least one further report information may for instance be obtained by receiving the report information and/or the at least one further report information, e.g. from the first apparatus and/or from at least one further first apparatus (e.g. at least one gateway device).

The determining of the position information for the report information and/or for the further report information in case the report information and/or for the further report information do not comprise the position information and/or the determining of the position of at least one of the one or more beacon devices may for instance be performed and/or controlled in the same way as described above.

In this exemplary embodiment of the second exemplary aspect of the present invention, the report information (e.g. outputted by the first apparatus) and the at least one further report information (e.g. provided by another first apparatus) may be obtained by the second apparatus. Then, the report information and the at least one further report information may be used for the determining of the position of at least one of the one or more beacon devices.

According to an exemplary embodiment of the second exemplary aspect of the present invention, the one or more identifiers of the one of more beacon devices are scanned prior to the obtaining, where the scanning is performed for the duration of a pre-defined or determined according to pre-defined rule time interval.

The scanning may for instance be performed by the second apparatus in the same way as described above. Further, the time interval may for instance be the same time interval as described above.

Additionally, by ensuring that the report information and/or the at least one further report information comprise identifiers of the one or more beacon devices that are scanned during the same pre-determined or determined according to pre-defined rule time interval may enable the most accurate determining of the position of the at least one beacon device of the one or more beacon devices.

According to an exemplary embodiment of the second exemplary aspect of the present invention, the method further comprises:

outputting the determined position of the at least one beacon device of the one or more beacon devices.

The determined position of the at least one of the one or more beacon devices is then output, e.g. to an apparatus (e.g. the first apparatus, or to a terminal, to name but a few non-limiting examples) or to another apparatus that transfers the determined position of the at least one of the one or more beacon devices to the first apparatus or to the terminal.

In this way, the position may for instance be provided to an entity that e.g. has requested a position of at least one beacon device of the one or more beacon devices to be determined.

According to an exemplary embodiment of the second exemplary aspect of the present invention, the second apparatus is a server providing indoor positioning and/or floor detection services and/or radio maps for enabling indoor positioning and/or floor detection services.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
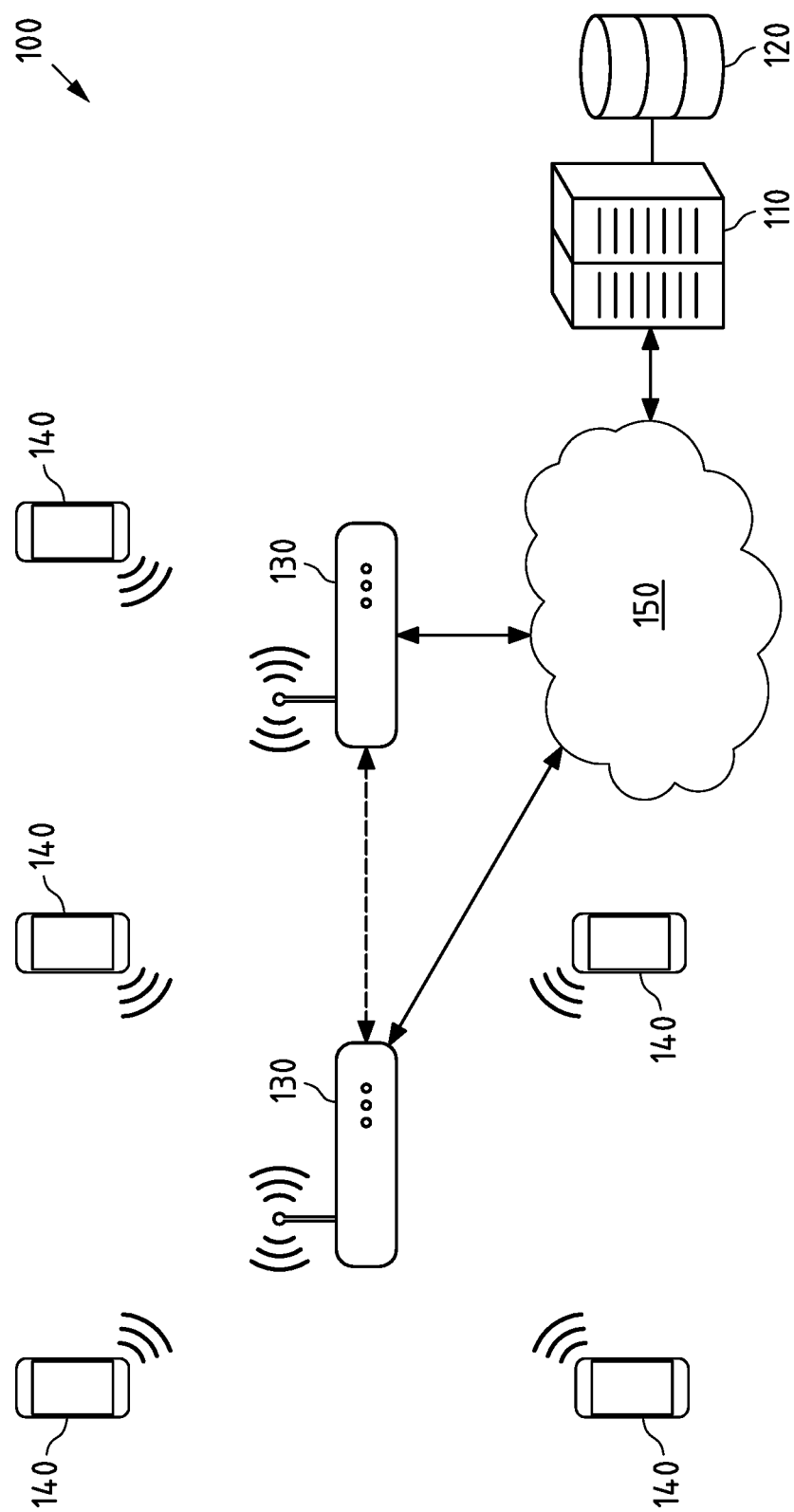
FIG. 1 is a schematic block diagram of a system according to an exemplary aspect of the present invention.

FIG. 1 is a schematic high-level block diagram of a system 100 according to an exemplary aspect of the present invention. System 100 comprises a server 110, a database 120, a plurality of gateway devices 130, a plurality of beacon devices 140, e.g. low-capability devices (e.g. (tracking) tags, IoT (Internet of Things) devices, or the like to name but a few non-limiting examples), and a communication network 150. One or more of the entities comprised by the system 100 may for instance be comprised (e.g. installed and/or located) in a venue (e.g. a building, office building, shopping mall, station, airport, university, public accessible buildings, to name but a few non-limiting examples). The system 100 may for instance be used for providing indoor positioning and/or floor detection services in such a venue.

The server 110 may for instance provide indoor positioning and/or floor detection services and/or one or more radio maps for enabling indoor positioning and/or floor detection.

The server 110 may alternatively be embodied as a server cloud (e.g. a plurality of servers connected, e.g. via the Internet and providing services at least partially jointly).

One or more of the low-capability devices 140 may for instance be IoT devices. The low-capability devices 140 may for instance broadcast their identifiers. The broadcasted identifier may for instance be comprised by a signal. Such a broadcasted identifier may for instance be observable by the gateway devices 130, which is located within the coverage area of the low-capability device 140 broadcasting the identifier. The gateway device 130 may for instance be able to observe the broadcasted identifier in case the gateway device 130 scans for such a broadcast, e.g. monitoring for such broadcasted identifier, e.g. on a pre-determined communication channel. The communication channel may for instance be pre-determined by the communication standard used by the system 100.

Further, the communication standard used between entities of the system 100 may for instance be different. For instance, the communication standard between a beacon device and a gateway device 130 may for instance be according to BT- or BLE communication standard. Further, the communication standard between a gateway device 130 and the internet may for instance be according to WLAN- and/or cellular (e.g. 2G (GPRS), 3G, LTE—(Long Term Evolution), and/or future 5G to name but a few non-limiting examples) communication standard, e.g. enabled by a wireless transmission. Additionally or alternatively, the communication standard between a gateway device 130 and the internet may for instance be according to LAN—(Local-Area Network) and/or WAN—(Wide Area Network) communication standard, e.g. enabled by a wire-bound transmission.

The gateway devices 130 may for instance be radio nodes, e.g. Access Points according to the Wi-Fi (e.g. WLAN (Wireless Local Area Network)), BT (Bluetooth), BLE (Bluetooth Low Energy) communication standard to name but a few non-limiting examples. Such a gateway device 130 may for instance comprise a transceiver for enabling the gateway device 130 to receive and/or transmit one or more information, e.g. from and/or to other devices (e.g. of the venue).

At least one of the gateway devices 130 is connected to the server 110, e.g. via the communication network (e.g. the internet). The communication network may provide wire-bound (e.g. according to LAN (Local Area Network)) or wireless communication connection (e.g. according to the Wi-Fi, BT, and/or BLE communication standard.

The gateway devices 130 may alternatively form a mesh communication network. In such a case, it is possible that only a single gateway device 130 is connected to the server 110, e.g. via the communication network 150. Other gateway devices, e.g. of the venue, may for instance be able to communicate with the single gateway device 130 that is connected to the server 110. Communication between the other gateway devices 130 and the server 110 may then for instance be provided via the single gateway 130 that relays the communication between the other gateway devices 130 and the server 110.

The server 110 may for instance comprise or be connectable to the database 120. The database 120 may for instance comprise a memory for storing e.g. one or more position information of the gateway devices, and/or one or more radio maps, e.g. of the venue. The one or more position information may for instance be indicative of a position of the gateway devices 130, e.g. in the venue, wherein the one or more position information may for instance be associated with one or more device identifiers identifying the gateway devices 130. The radio maps stored in the memory may for instance enable at least one of the gateway devices 130 to determine its position (e.g. in the venue), and/or to determine the position of other gateway devices 130 (e.g. in the venue). The radio map may for instance comprise one or more received signal strength values observable at a specific location (e.g. in the venue). For instance, based on a measurement of a received signal strength value, the position may be determined at which the measurement was obtained based at least partially on the radio map, e.g. by a comparison of the measured received signal strength values with those of the radio map.

In an example embodiment, the server 110 may be optional. In this example embodiment, at least one of the gateway devices 130 may for instance provide the functionalities and/or services, which the server 110 provides and/or performs in the other alternative embodiment, e.g. to at least one of the gateway devices 130.

Figure 2:
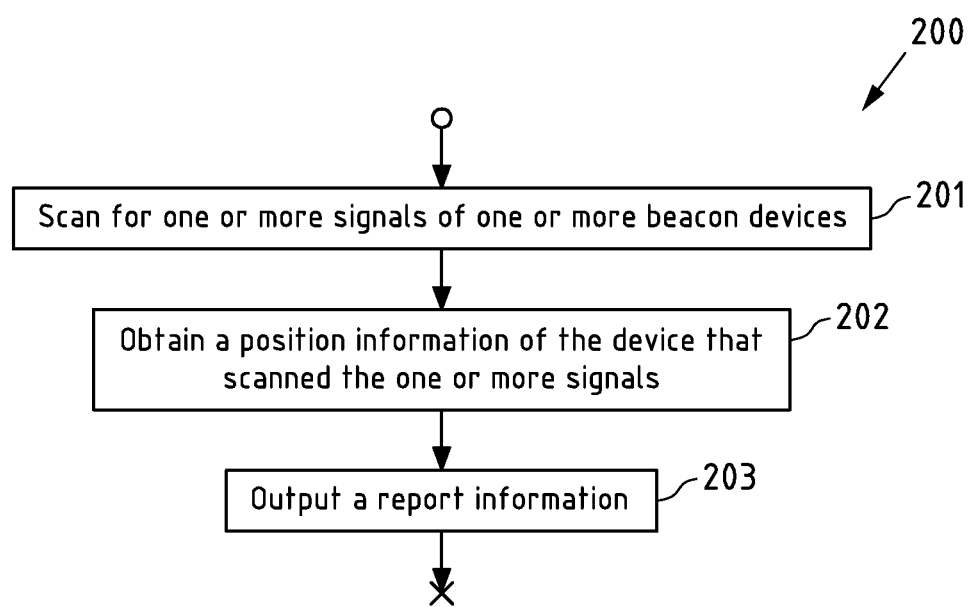
FIG. 2 is a flowchart showing an example embodiment of a method according to the first exemplary aspect of the present invention, for instance performed by gateway device 130 of FIG. 1.

FIG. 2 is a flowchart 200 showing an example embodiment of a method according to the first exemplary aspect of the present invention. The flowchart 200 may, for instance be performed by a gateway device, e.g. at least one of the gateway devices 130 of FIG. 1.

In a first step 201, one or more signals sent by one or more respective beacon devices (e.g. low-capability devices 140 of FIG. 1) are scanned. Each signal of the one or more signals comprises an identifier of the respective beacon device, wherein one or more identifiers of the one or more beacon devices are determined based on the one or more signals of the one or more beacon devices.

In a second step 202, a position information representing the position of the gateway device is obtained, e.g. from a memory (e.g. database 120 of FIG. 1).

In a third step 203, a report information comprising the determined one or more identifiers of the one or more beacon devices and the determined position information of the gateway device is outputted (e.g. to the gateway devices 130 of FIG. 1 that are different from the at least one gateway device 130 of FIG. 1). The report information is outputted for using it to determine the position of at least one of the one or more beacon devices (e.g. at least one of the low-capability devices 140 of FIG. 1).

Figure 3:
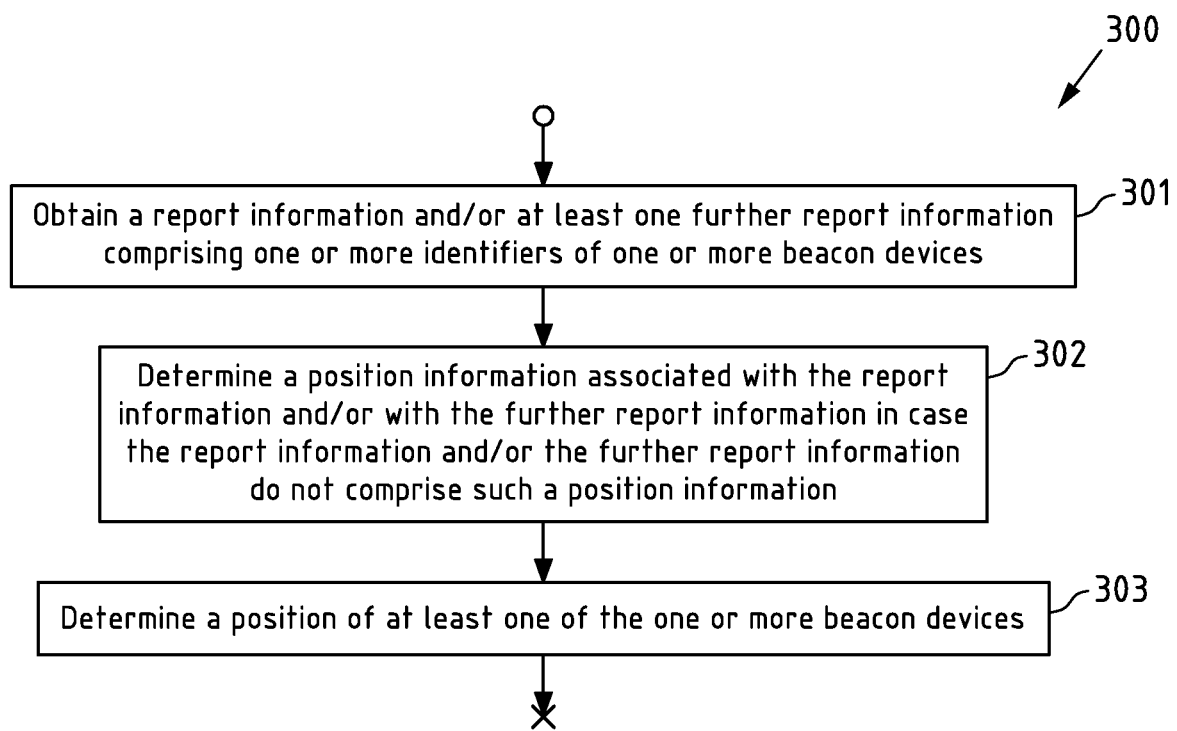
FIG. 3 is a flowchart showing an example embodiment of a method according to the second exemplary aspect of the present invention, for instance performed by server 110 of FIG. 1.

FIG. 3 is a flowchart 300 showing an example embodiment of a method according to the second exemplary aspect of the present invention. The flowchart 300 may, for instance be performed by a server, e.g. server 110 of FIG. 1, or by a gateway device, e.g. at least one of the gateway devices 130 of FIG. 1.

In a first step 301, a report information and/or at least one further report information respectively comprising one or more identifiers and/or one more further identifiers of one or more beacon devices (e.g. low-capability devices 140 of FIG. 1) and a position information or a device identifier of a device that provided the report information and/or the at least one further report information is obtained, e.g. by receiving the report information and/or the at least one further report information from the gateway devices 130 of FIG. 1.

In a second step 302, position information associated with the report information and/or with the further report information is determined in case the report information and/or the further report information do not comprise such a position information. Consequently, if the report information and/or for the further report does comprise such a position information, step 302 may not be present in the flowchart 300. The position information is determined based at least partially on the device identifier and/or the further device identifier.

In a third step 303, a position of at least one of the one or more beacon devices (e.g. at least one of the low-capability device 140 of FIG. 1) based at least partially on the one or more identifiers and/or the one or more further identifiers of the one or more beacon devices and the position information and/or the determined position information is determined.

Figure 4:
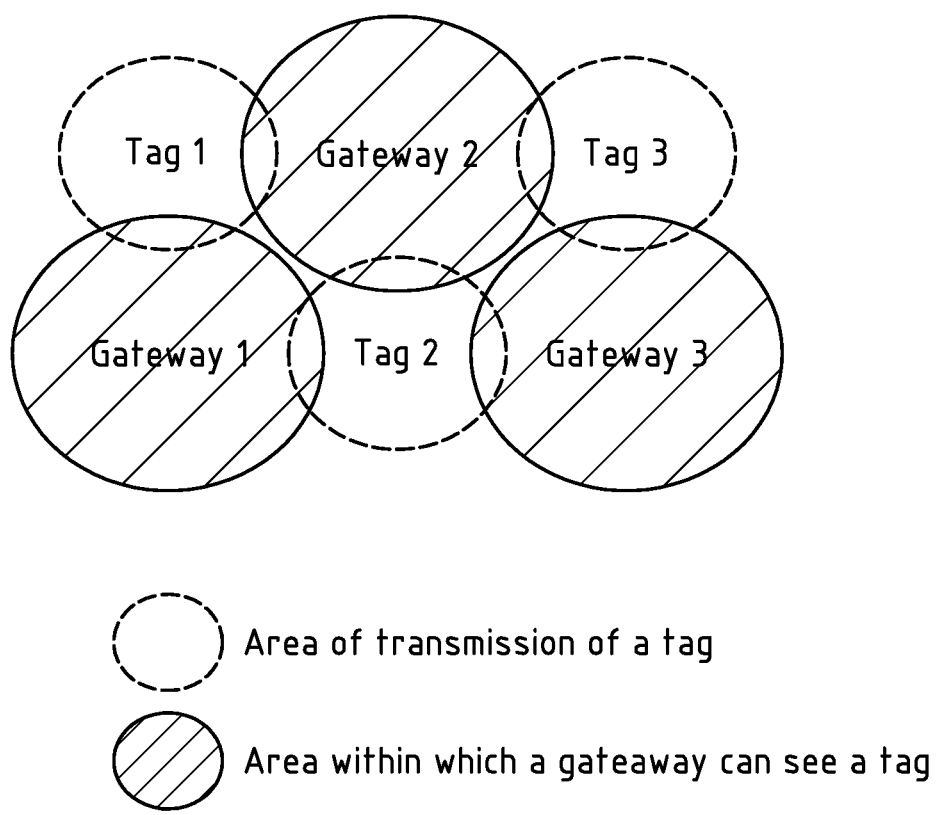
FIG. 4 is a schematic visualization of coverage areas of a plurality of gateway devices, for instance gateway devices 130 of FIG. 1, and a plurality of low-capability devices, for instance low-capability devices 140 of FIG. 1.

FIG. 4 is a schematic visualization of coverage areas of a plurality of gateway devices, for instance gateway devices 130 of FIG. 1, and a plurality of low-capability devices, for instance low-capability devices 140 of FIG. 1.

It can be seen in FIG. 4 that a low-capability device is observable by one or more gateway devices, which are located within the coverage area of said low-capability device. Each of the gateway devices located within the coverage area of said low-capability device may for instance scan for one or more signals sent by the low-capability device. Thus, the one or more signals sent by the low-capability device may for instance be received by more than one of the gateway devices. Further, gateway devices that scanned the one or more signals sent by the low-capability device may transmit report information comprising one or more identifiers of the low-capability devices, wherein said gateway devices have received one or more signals comprising the one or more identifiers of the low-capability devices.

The outputted report information may be received by the other gateway devices. Then, the gateway devices may for instance be capable of determining the position of at least one of the low-capability devices, e.g. by a triangulation. Further details of determining the position of the at least one low-capability device based on the one or more signals comprising the one or more identifiers of the low-capability devices are described below in the further exemplary embodiment.

Figure 5:
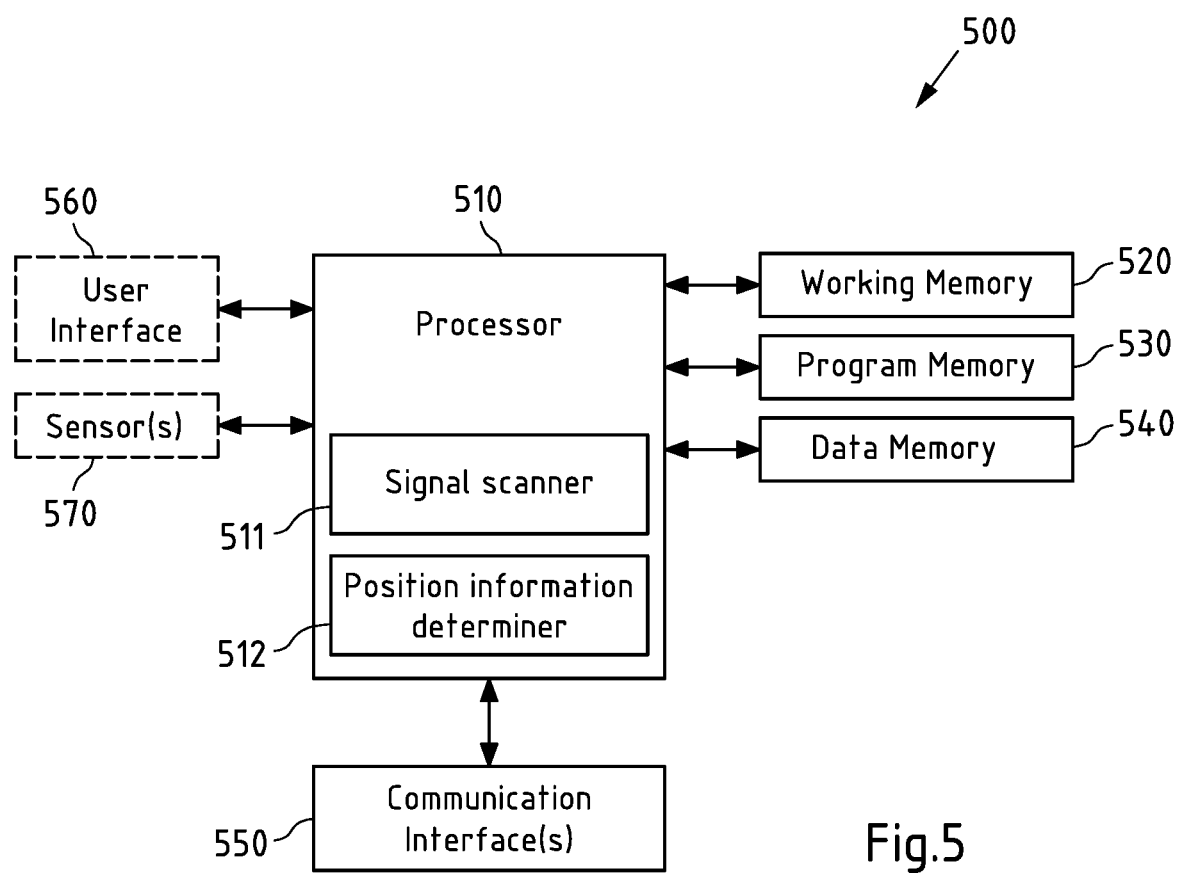
FIG. 5 is a schematic block diagram of a first apparatus according to the first exemplary aspect of the present invention.

FIG. 5 is a schematic block diagram of an apparatus according to an exemplary aspect of the present invention, which may for instance represent at least one of the gateway devices 130 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the first and/or second exemplary aspect. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first and/or second exemplary aspect of the invention.

Processor 510 may for instance comprise a signal scanner 511 as a functional and/or structural unit. Signal scanner 511 may for instance be configured to scan for one or more signals of one or more beacon devices (see step 201 of FIG. 2). Processor 510 may for instance comprise a position information determiner 512 as a functional and/or structural unit. Position information determiner 512 may for instance be configured to determine a position information (see step 202 of FIG. 2).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first and/or second exemplary aspect.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 550 enable apparatus 500 to communicate with other entities, e.g. with one or more beacon devices 140 of FIG. 1, or with server 110 FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise an accelerometer, a camera, or the like to name but a few non-limiting examples, e.g. to determine further pieces of information, which may for instance be used in a method according to the first and/or second exemplary aspect of the present invention.

Some or all of the components of the apparatus 500 may for instance be connected via a bus. Some or all of the components of the apparatus 500 may for instance be combined into one or more modules.

Figure 6:
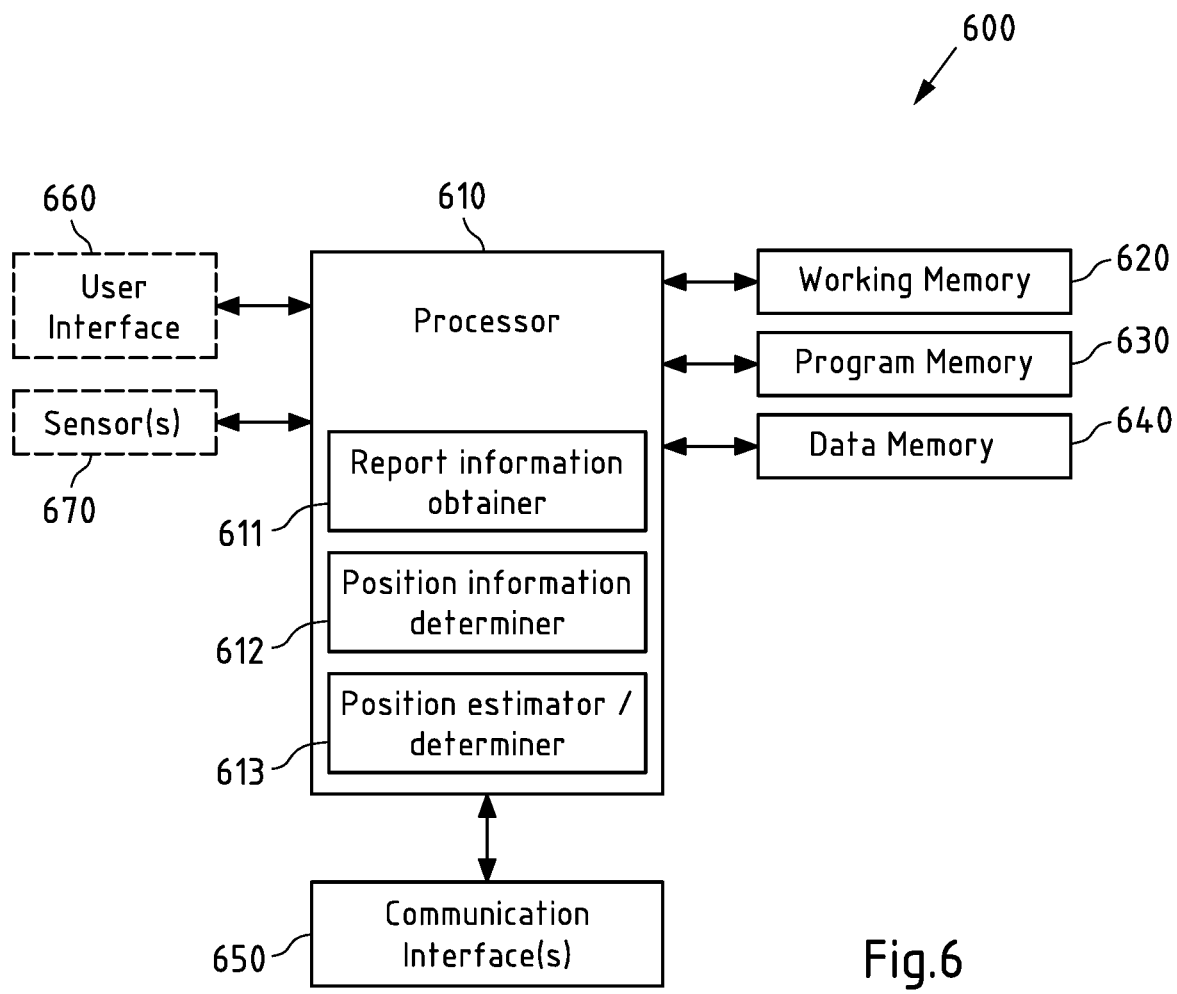
FIG. 6 is a schematic block diagram of a second apparatus according to the second exemplary aspect of the present invention.

FIG. 6 is a schematic block diagram of an apparatus according to an exemplary aspect of the present invention, which may for instance represent server 110 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the second exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the second exemplary aspect of the invention.

Processor 610 may for instance comprise a report information obtainer 611 as a functional and/or structural unit. Report information obtainer 611 may for instance be configured to obtain at least one report information (see step 301 of FIG. 3). Processor 610 may for instance comprise a position information determiner 612 as a functional and/or structural unit. Position information determiner 612 may for instance be configured to determine a position information (see step 302 of FIG. 3). Processor 610 may for instance comprise a position estimator/determiner 613 as a functional and/or structural unit. Position estimator/determiner 613 may for instance be configured to determiner a position of at least one of one or more beacon devices report information (see step 303 of FIG. 3).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the second exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 650 enable apparatus 600 to communicate with other entities, e.g. with one or more gateway devices 130 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise an accelerometer, a camera, or the like to name but a few non-limiting examples, e.g. to determine further pieces of information, which may for instance be used in a method according to the second exemplary aspect of the present invention.

Some or all of the components of the apparatus 600 may for instance be connected via a bus. Some or all of the components of the apparatus 600 may for instance be combined into one or more modules.

The following exemplary embodiments of the present invention shall also be considered to be disclosed:

Have smart gateway devices that are capable of generating their own Wi-Fi scans and determining their position using an online positioning service. These gateways also scan for low-capability devices. They communicate this visibility (proximity to a gateway device of known position) to a central online server. The central server gathers multiple readings from multiple gateway devices and generates an estimated actual position for the low-capability device.

A similar scenario, where the gateways are not capable of performing Wi-Fi scans and using them to determine their own position can also be resolved. Instead, their location is stored centrally in a system accessible from the position estimating service. This location data is only brought together at the central point.

It is also possible to construct a distributed model. There is no central estimation service that uses the multiple visibility reports to infer the probable location of the low-profile device. Instead, the gateway devices communicate a list of what low-capability devices are visible at all times. The gateways can then perform a predictable and deterministic estimation algorithm themselves to determine the location of the visible low-capability devices. This can optionally be relayed to a central position tracking solution or used within the local network.

Further, move not only the positioning algorithm to the cloud but also the generation of the WiFi scan. WAPs themselves maintain a list of devices they can see (as MAC address) and the signal strength (RSSI) between WAP and device. Have WAPs send this data to a central service for processing. The service will regroup the reports by the MAC address of the device limited to a certain time window. The resultant data will look exactly like a scan generated by a device. This 'synthesized scan' can be used the same as a standard scan and a location can be determined using it even though the device it describes would not have the capabilities to perform or report this scan itself.

Additional scenario—low cost gateway devices:

There are further scenarios in this solution to consider. It is also possible to cater for lower capability gateway hardware to further reduce cost. This can be a considerable factor in large scale deployments and allows the algorithm to be included into existing infrastructure such as Wi-Fi Access Points (WAPs) to enable them to act as gateway devices.

In this scenario, the task for processing and combining the scans is pushed from the gateway to the cloud or to a central node. As before, the gateways scan and generate a list of devices they can see (as MAC address) and the signal strength (RSSI) between gateway and device. The above algorithm can be applied to raw MAC address and RSSI measurements in much the same way as it was applied to positions. The MAC addresses and RSSI scans are sent to the same position resolution service as discussed above (note: as above, this can be replaced with the distributed model). The service will regroup the reports by the MAC address of the device limited to a certain time window. The resultant data will look exactly like a scan generated by a device. This 'synthesized scan' can be used the same as a standard scan and a location can be determined using it even though the device it describes would not have the capabilities to perform or report this scan itself.

There is a practical challenge in tuning the time window used for regrouping. If the window is too short, a device may only be in the report of a single WAP, making its determined position highly inaccurate. If the window is too long, a single moving device will turn up in the reports of too many WAPs and it will lead to contradictory results. This means its determined position will be inaccurate. Determining the correct window depends on the technology and the type of movement exhibited by the tracked device. The window length may for instance be determined, at least partially, by an initial calibration phase. By incrementally increasing or decreasing the window length (e.g. starting small (e.g. 1 second) and increasing or decreasing until e.g. horizontal accuracy determined by the positioning algorithm is at an optimum, as disclosed above in the summary of some exemplary embodiments section of the description. The window could be determined automatically by the gateway (e.g. the gateway device 130 of FIG. 1) through a calibration phase with a beacon device (e.g. low-capability devices 140 of FIG. 1) e.g. moving in a typical pattern. The beacon devices may not have to announce their broadcast frequency, but it would make the calibration phase shorter.

Without announcing broadcast frequency: The gateway network starts the calibration phase with an arbitrarily selected window—e.g. 1 second—then performs the scan synthesis. This window is increased and the synthesis is performed again. This "increase, rescan" procedure can be repeated any number of times but it is only necessary to repeat enough to determine whether the accuracy is getting worse or better. If it's getting worse, the window length is shortened below the original window and the process repeats down the way. Similarly, if the accuracy is increasing, continue "going up" until the accuracy degrades.

Through this process, the gateway devices will settle on an optimum window length for the use case.

The communication process between the gateway devices may not be specified. The calibration phase may for instance be completely automated and done periodically to keep the system optimal.

In the following, an exemplary embodiment is given: Consider a long corridor with gateway devices evenly spaced along it. There is a person walking from one end to the other carrying a BLE tag (e.g. low-capability device 140 of FIG. 1) which broadcasts its ID once every 3 e.g. seconds (for this example).

If the scanning 'window' is too short, a gateway device may complete its scan without having seen the BLE tag. The BLE tag may be seen by only a single gateway device at the start of the corridor or may be faintly seen by another further down. When these measurements are combined, the algorithm cannot give a precise location of the BLE tag. There are multiple possible locations for the BLE tag and so it is assigned a very large accuracy radius (low precision).

The BLE tag may not be picked up by any gateway devices (no position at all) or may be picked up by several but at times inconsistent with the person's journey (they may appear to jump up and down the corridor).

If the scanning window is too long (significantly larger than the ID broadcast frequency), the BLE tag will appear on several gateway devices as it moves. There will be a strong signal detected at the start, middle and end of the corridor. This will also result in a low precision position determination.

The determination of this window is a function of the broadcast frequency of the beacon device (e.g. low-capability device 140 of FIG. 1; BLE tag), wherein the window is typically around 1 broadcast per second, and the speed of movement of the item (BLE tag or attached to such a BLE tag to name but a few non-limiting examples) being tracked (highly use case dependent).

The accuracy radius achieved as a result of the determining of the position of such a beacon device would look like a parabolic curve when plotted comprising one minimum and an opening at the top.

This technique is demonstrated in the following example (therein, RSSI measurement is optional). The timestamp as used in the following examples is a unix epoch millisecond timestamp representing the number of milliseconds since midnight 1 Jan. 1970. The seconds mentioned below are based on the timestamp where "15 seconds" is 15000 milliseconds.

| Initial data from WAPs |
|---|
| {<br>  ap1mac: {<br>    scan: [{<br>      mac: device1mac<br>      rssi: device1ap1rssi<br>    },{<br>      mac: device2mac<br>      rssi: device2ap1rssi<br>    },{<br>      mac: device3mac<br>      rssi: device3ap1rssi<br>    }],<br>    timestamp: 1486806755149<br>  },<br>  ap2mac: {<br>    scan: [{<br>      mac: device1mac<br>      rssi: device1ap2rssi<br>    },{<br>      mac: device2mac |

| Initial data from WAPs |
|---|
|       rssi: device2ap2rssi<br>    }],<br>    timestamp: 1486806762362<br>  },<br>  etc...<br>} |

Formatted data from the WAPs:
1486806755149, ap1mac, device1mac, device1ap1rssi, device2mac, device2ap1rssi, device3mac, device3ap1rssi
1486806762362, ap2mac, device1mac, device1ap2rssi, device2mac, device2ap2rssi
1486806767998, ap3mac, device3mac, device3ap3rssi
1486806769097, ap4mac, device2mac, device2ap4rssi, device3mac, device3ap4rssi
1486806793016, ap1mac, device1mac, device1ap1rssi, device3mac, device3ap1rssi After flatMap (further reformatting):
1486806755149, device1mac, ap1mac, device1ap1rssi
1486806755149, device2mac, ap1mac, device2ap1rssi
1486806755149, device3mac, ap1mac, device3ap1rssi
1486806762362, device1mac, ap2mac, device1ap2rssi
1486806762362, device2mac, ap2mac, device2ap2rssi
1486806767998, device3mac, ap3mac, device3ap3rssi
1486806769097, device2mac, ap4mac, device2ap4rssi
1486806769097, device3mac, ap4mac, device3ap4rssi
1486806793016, device1mac, ap1mac, device1ap1rssi
1486806793016, device3mac, ap1mac, device3ap1rssi When applying 15-seconds time windows, the following is obtained:

Window 1:
1486806755149, device1mac, ap1mac, device1ap1rssi
1486806755149, device2mac, ap1mac, device2ap1rssi
1486806755149, device3mac, ap1mac, device3ap1rssi
1486806762362, device1mac, ap2mac, device1ap2rssi
1486806762362, device2mac, ap2mac, device2ap2rssi
1486806767998, device3mac, ap3mac, device3ap3rssi
1486806769097, device2mac, ap4mac, device2ap4rssi
1486806769097, device3mac, ap4mac, device3ap4rssi Window 2:
1486806793016, device1mac, ap1mac, device1ap1rssi
1486806793016, device3mac, ap1mac, device3ap1rssi NOTE: The example below continues with window 1 from above.

Group by device MAC (timestamp is skipped):
device1mac, ap1mac, device1ap1rssi, ap2mac, device1ap2rssi
device2mac, ap1mac, device2ap1rssi, ap2mac, device2ap2rssi, ap4mac, device2ap4rssi
device3mac, ap1mac, device3ap1rssi, ap3mac, device3ap3rssi, ap4mac, device3ap4rssi Format to generate "synthesized scans" for Indoor Positioning (e.g. conventional indoor positioning where the devices report the APs they can presently "hear" and the associated RSSI values):

| |
|---|
| {<br>  device1mac: {<br>    scan: [{<br>      mac: ap1mac<br>      rssi: device1ap1rssi<br>    },{<br>      mac: ap2mac |

-continued

```
        rssi: device1ap2rssi
      },{
    },
    device2mac: {
      scan: [{
        mac: ap1mac
        rssi: device2ap1rssi
      },{
        mac: ap2mac
        rssi: device2ap2rssi
      },{
        mac: ap4mac
        rssi: device2ap4rssi
      }]
    },
    device3mac: {
      scan: [{
        mac: ap1mac
        rssi: device3ap1rssi
      },{
        mac: ap3mac
        rssi: device3ap3rssi
      },{
        mac: ap4mac
        rssi: device3ap4rssi
      }]
    }
}
```

As can be seen in the example, the signal readings are used reciprocally enabling, at least partially, the determining of the position of the BLE tag device(s). This works under the assumption that the signal path in free space will be subject to a symmetrical signal strength loss. A beacon and a gateway both transmit at a known signal strength, (e.g. −10 dBm). If a beacon signal is received at a gateway with −40 dBm, the assumption is that if a gateway were to send that signal at −10 dBm, the beacon would receive the signal also at −40 dBm, given that the path loss is symmetrical.

This observation is done within a short timeframe, as e.g. other objects in space may affect the signal loss of the channel.

The measurement should be the same whether it had been broadcast from e.g. BLE tag device A and detected by e.g. gateway device B or broadcast by gateway device B with the same strength and detected by BLE tag device A Positioned-gateway case:

As already described above, in an alternative embodiment of the invention, the above capability is leveraged and applied to areas where more than one Infrastructure Access Point is available.

A worked example (using layout in the below diagram (FIG. 4)) is as follows (in addition, RSSI values could be measured and used for positioning here as well):

Gateway1: scan {Visible WiFi APs, Visible BLE Tags (Tag1, Tag2)}
Gateway2: scan {Visible WiFi APs, Visible BLE Tags (Tag1, Tag2, Tag3)}
Gateway3: scan {Visible WiFi APs, Visible BLE Tags (Tag2, Tag3)}

The Visible Wi-Fi Access Points are used (e.g. at the respective gateway, or at a central device) to determine a position for the respective gateway. The Visible BLE Tags indicate which BLE tags are visible at the respective gateway.

Position resolving (determining of the gateway position from the Visible WiFi Aps) yields the following data:
Gateway1 Position (Tag1, Tag2)
Gateway2 Position (Tag1, Tag2, Tag3)
Gateway3 Position (Tag2, Tag3)

This data is collected/re-arranged for each tag:
Tag1: Gateway1 position, Gateway2 position
Tag2: Gateway1 position, Gateway2 position, Gateway3 position
Tag3: Gateway2 position, Gateway3 position The gathered positions are used to estimate the actual position of the tag, e.g. using an average position (e.g. weighted by the signal strength between the tag and the gateway).

The following embodiments of the invention shall also be considered to be disclosed:

Embodiment 1

A first method performed and/or controlled by at least one first apparatus, the method comprising:
  scanning for one or more signals sent by one or more beacon devices, wherein each signal of the one or more signals comprises an identifier of the beacon device, which has sent the signal of the one or more signals, wherein one or more identifiers of the one or more beacon devices are determined based on the one or more signals of the one or more beacon devices;
  obtaining a position information representing the position of the at least one first apparatus; and
  outputting a report information comprising the determined one or more identifiers of the one or more beacon devices and the position information of the at least one first apparatus to allow usage of the outputted report information to determine the position of at least one of the one or more beacon devices.

Embodiment 2

The first method according to embodiment 1, wherein the position information is obtained by determining the position of the first apparatus based at least partially on the scanned one or more signals of the one or more beacon devices and/or on a radio map.

Embodiment 3

The first method according to embodiment 1 or embodiment 2, wherein the position information is obtained from a memory.

Embodiment 4

The first method according to any of the preceding embodiments, further comprising:
  obtaining at least one further report information comprising one or more further identifiers identifying the one or more beacon devices, and a device identifier or a further position information of a device that provided the at least one further report information.

Embodiment 5

The first method according to embodiment 4, further comprising:
  determining a position information for the device that provided the at least one further report information based at least partially on the device identifier.

Embodiment 6

The first method according to embodiment 4 or embodiment 5, further comprising:

determining a position of at least one of the one or more beacon devices based at least partially on the one or more identifiers and/or the one or more further identifiers of the one or more beacon devices and the position information representing the position of the first apparatus and/or the position information of the device that provided the at least one further report information.

Embodiment 7

The first method according to any of the preceding embodiments, wherein the scanning is performed for the duration of a pre-defined or determined according to pre-defined rule time interval.

Embodiment 8

The first method according to embodiment 7, wherein the time interval is determined based on a function of a frequency at which the one or more signals of the one or more beacon devices are sent and a speed of movement of the at least one beacon device of the one or more beacon devices whose position is to be determined.

Embodiment 9

The first method according to any of the preceding embodiments, wherein one or more received signal strength values are determined based on the one or more signals of the one or more beacon devices, wherein the report information to be outputted and/or the obtained report information comprises the one or more determined received signal strength value.

Embodiment 10

The first method according to embodiment 9, further comprising:
determining reciprocal one or more received signal strength values based on the one or more received signal strength values, wherein each reciprocal received signal strength value of the determined reciprocal one or more received signal strength values is indicative of a received signal strength value observable at the position of at least one of the one or more beacon devices; and wherein the position of at least one of the one or more beacon devices is determined further based on the reciprocal one or more received signal strength values.

Embodiment 11

The first method according to any of the preceding embodiments, wherein each identifier of the one or more identifier and/or each further identifier of the one or more further identifiers of the one or more beacon devices is a MAC address and/or the first apparatus is identified based on a MAC address and/or the device identifier of the device that provided the at least one further report information is a MAC-address.

Embodiment 12

The first method according to any of the preceding embodiments, wherein the first apparatus is a gateway device capable of performing and/or controlling the method according to claim 1.

Embodiment 13

A second method, performed by at least one second apparatus, comprising:
obtaining a report information, or a report information and at least one further report information, wherein the report information or the report information and the at least one further report information respectively comprise one or more identifiers and/or one more further identifiers of one or more beacon devices and a position information or a device identifier of a device that provided the report information and/or the at least one further report information;
determining a position information associated with the report information and/or with the further report information in case the report information and/or the further report information do not comprise such a position information, wherein the position information is determined based at least partially on the device identifier and/or the further device identifier comprised by the obtained report information and/or the obtained further report information; and
determining a position of at least one of the one or more beacon devices based at least partially on the one or more identifiers and/or the one or more further identifiers of the one or more beacon devices and the position information comprised by the obtained report information and/or by the obtained further report information and/or the determined position information.

Embodiment 14

The second method according to embodiment 13, wherein the one or more identifiers of the one of more beacon devices are scanned prior to the obtaining, where the scanning is performed for the duration of a pre-defined or determined according to pre-defined rule time interval.

Embodiment 15

The second method according to embodiment 14, wherein the time interval is determined based on a function of a frequency at which the one or more signals of the one or more beacon devices are sent and a speed of movement of the at least one beacon device of the one or more beacon devices whose position is to be determined.

Embodiment 1416

The second method according to any of the embodiments 13 to 15, wherein the position information is obtained by determining the position of the first apparatus based at least partially on the scanned one or more signals of the one or more beacon devices based on a triangular direction finding and/or on a radio map.

Embodiment 17

The second method according to any of the embodiments 13 to 16, wherein the position information is obtained from a memory.

Embodiment 18

The second method according to any of the embodiments 13 to 17, wherein one or more received signal strength values are comprised by the report information and/or the at least one further report information.

Embodiment 19

The second method according to embodiment 18, further comprising:
determining reciprocal one or more received signal strength values based on the one or more received signal strength values, wherein each reciprocal received signal strength value of the determined reciprocal one or more received signal strength values is indicative of a received signal strength value observable at the position of at least one of the one or more beacon devices; and wherein the position of at least one of the one or more beacon devices is determined further based on the reciprocal one or more received signal strength values.

Embodiment 20

The second according to any of the embodiments 13 to 19, wherein each identifier of the one or more identifier and/or each further identifier of the one or more further identifiers of the one or more beacon devices is a MAC address and/or the first apparatus is identified based on a MAC address and/or the device identifier of the device that provided the at least one further report information is a MAC-address.

Embodiment 21

The second method according to any of the embodiments 13 to 20, further comprising:
outputting the determined position of the at least one of the one or more beacon devices.

Embodiment 22

The second method according to any of the embodiments 13 to 21, wherein the second apparatus is a server providing positioning services and/or radio maps for enabling positioning services.

Embodiment 23

An apparatus configured to perform and/or control or comprising respective means for performing and/or controlling the method of any of the embodiments 1 to 12.

Embodiment 24

An apparatus comprising at least one processor and at least one memory including computer program code, the at least one memory and the computer program code configured to, with the at least one processor, cause an apparatus at least to perform and/or control the method of any of the embodiments 1 to 12.

Embodiment 25

An apparatus configured to perform and/or control or comprising respective means for performing and/or controlling the method of any of the embodiments 13 to 22.

Embodiment 26

An apparatus comprising at least one processor and at least one memory including computer program code, the at least one memory and the computer program code configured to, with the at least one processor, cause an apparatus at least to perform and/or control the method of any of the embodiments 13 to 22.

Embodiment 27

A first apparatus comprising at least one processor and at least one memory including computer program code, the at least one memory and the computer program code configured to, with the at least one processor, cause the first apparatus to at least perform:
scanning for one or more signals sent by one or more beacon devices, wherein each signal of the one or more signals comprises an identifier of the beacon device, which has sent the signal of the one or more signals, wherein one or more identifiers of the one or more beacon devices are determined based on the one or more signals of the one or more beacon devices;
obtaining a position information representing the position of the at least one first apparatus; and
outputting a report information comprising the determined one or more identifiers of the one or more beacon devices and the position information of the at least one first apparatus to allow usage of the outputted report information to determine the position of at least one of the one or more beacon devices.

Embodiment 28

The first apparatus according to embodiment 27, wherein the position information is obtained by determining the position of the first apparatus based at least partially on the scanned one or more signals of the one or more beacon devices and/or on a radio map.

Embodiment 29

The first apparatus according to embodiment 27 or embodiment 28, wherein the position information is obtained from a memory.

Embodiment 30

The first apparatus according to any of the embodiments 27 to 29, the at least one memory and the computer program code configured to, with the at least one processor, cause the first apparatus further to perform:
obtaining at least one further report information comprising one or more further identifiers identifying the one or more beacon devices, and a device identifier or a further position information of a device that provided the at least one further report information.

Embodiment 31

The first apparatus according to embodiment 30, the at least one memory and the computer program code configured to, with the at least one processor, cause the first apparatus further to perform in case the at least one further report information does not comprise the further position information:
determining a position information for the device that provided the at least one further report information based at least partially on the device identifier.

Embodiment 32

The first apparatus according to embodiment 30 or embodiment 31, the at least one memory and the computer program code configured to, with the at least one processor, cause the first apparatus further to perform:

> determining a position of at least one of the one or more beacon devices based at least partially on the one or more identifiers and/or the one or more further identifiers of the one or more beacon devices and the position information representing the position of the first apparatus and/or the position information of the device that provided the at least one further report information.

Embodiment 33

The first apparatus according to any of the embodiments 27 to 32, wherein the scanning is performed for the duration of a pre-defined or determined according to pre-defined rule time interval.

Embodiment 34

The first apparatus according to embodiment 33, wherein the time interval is determined based on a function of a frequency at which the one or more signals of the one or more beacon devices are sent and a speed of movement of the at least one beacon device of the one or more beacon devices whose position is to be determined.

Embodiment 35

The first apparatus according to any of the embodiments 27 to 34, wherein one or more received signal strength values are determined based on the one or more signals of the one or more beacon devices, wherein the report information to be outputted and/or the obtained report information comprises the one or more determined received signal strength value.

Embodiment 36

The first apparatus according to embodiment 35, the at least one memory and the computer program code configured to, with the at least one processor, cause the first apparatus further to perform:

> determining reciprocal one or more received signal strength values based on the one or more received signal strength values, wherein each reciprocal received signal strength value of the determined reciprocal one or more received signal strength values is indicative of a received signal strength value observable at the position of at least one of the one or more beacon devices; and wherein the position of at least one of the one or more beacon devices is determined further based on the reciprocal one or more received signal strength values.

Embodiment 37

The first apparatus according to any of the embodiments 27 to 36, wherein each identifier of the one or more identifier and/or each further identifier of the one or more further identifiers of the one or more beacon devices is a MAC address and/or the first apparatus is identified based on a MAC address and/or the device identifier of the device that provided the at least one further report information is a MAC-address.

Embodiment 38

The first apparatus according to any of the embodiments 27 to 37, wherein the first apparatus is a gateway device capable of performing and/or controlling the method according to claim 1.

Embodiment 39

A second apparatus comprising at least one processor and at least one memory including computer program code, the at least one memory and the computer program code configured to, with the at least one processor, cause the second apparatus to at least perform:

> obtaining a report information, or a report information and at least one further report information, wherein the report information or the report information and the at least one further report information respectively comprise one or more identifiers and/or one more further identifiers of one or more beacon devices and a position information or a device identifier of a device that provided the report information and/or the at least one further report information;
>
> determining a position information associated with the report information and/or with the further report information in case the report information and/or the further report information do not comprise such a position information, wherein the position information is determined based at least partially on the device identifier and/or the further device identifier comprised by the obtained report information and/or the obtained further report information; and
>
> determining a position of at least one of the one or more beacon devices based at least partially on the one or more identifiers and/or the one or more further identifiers of the one or more beacon devices and the position information comprised by the obtained report information and/or by the obtained further report information and/or the determined position information.

Embodiment 40

The second apparatus according to embodiment 39, wherein the one or more identifiers of the one of more beacon devices are scanned prior to the obtaining, where the scanning is performed for the duration of a pre-defined or determined according to pre-defined rule time interval.

Embodiment 41

The second apparatus according to embodiment 40, wherein the time interval is determined based on a function of a frequency at which the one or more signals of the one or more beacon devices are sent and a speed of movement of the at least one beacon device of the one or more beacon devices whose position is to be determined.

Embodiment 42

The second apparatus according to embodiment 39 or embodiment 40, wherein the position information is obtained by determining the position of the first apparatus based at least partially on the scanned one or more signals of the one or more beacon devices based on a triangular direction finding and/or on a radio map.

Embodiment 43

The second apparatus according to any of the embodiments 39 to 42, wherein the position information is obtained from a memory.

Embodiment 44

The second apparatus according to any of the embodiments 39 to 43, wherein one or more received signal strength values are comprised by the report information and/or the at least one further report information.

Embodiment 45

The second apparatus according to embodiment 44, the at least one memory and the computer program code configured to, with the at least one processor, cause the second apparatus further to perform:
  determining reciprocal one or more received signal strength values based on the one or more received signal strength values, wherein each reciprocal received signal strength value of the determined reciprocal one or more received signal strength values is indicative of a received signal strength value observable at the position of at least one of the one or more beacon devices; and wherein the position of at least one of the one or more beacon devices is determined further based on the reciprocal one or more received signal strength values.

Embodiment 46

The second apparatus according to any of the embodiments 39 to 45, wherein each identifier of the one or more identifier and/or each further identifier of the one or more further identifiers of the one or more beacon devices is a MAC address and/or the first apparatus is identified based on a MAC address and/or the device identifier of the device that provided the at least one further report information is a MAC-address.

Embodiment 47

The second apparatus according to any of the embodiments 39 to 46, the at least one memory and the computer program code configured to, with the at least one processor, cause the second apparatus further to perform:
  outputting the determined position of the at least one of the one or more beacon devices.

Embodiment 48

The second apparatus according to any of the embodiments 39 to 47, wherein the second apparatus is a server providing positioning services and/or radio maps for enabling positioning services.

Embodiment 49

A computer program, the computer program when executed by a processor causing an apparatus to perform and/or control the actions of the method according to any of the embodiments 1 to 12.

Embodiment 50

A computer program, the computer program when executed by a processor causing an apparatus to perform and/or control the actions of the method according to any of the embodiments 13 to 22.

Embodiment 51

A first tangible computer-readable medium storing computer program code, the computer program code when executed by a processor causing an apparatus to perform and/or control:
  scanning for one or more signals sent by one or more beacon devices, wherein each signal of the one or more signals comprises an identifier of the beacon device, which has sent the signal of the one or more signals, wherein one or more identifiers of the one or more beacon devices are determined based on the one or more signals of the one or more beacon devices;
  obtaining a position information representing the position of the at least one first apparatus; and
  outputting a report information comprising the determined one or more identifiers of the one or more beacon devices and the position information of the at least one first apparatus to allow usage of the outputted report information to determine the position of at least one of the one or more beacon devices.

Embodiment 52

A second tangible computer-readable medium storing computer program code, the computer program code when executed by a processor causing an apparatus to perform and/or control:
  obtaining a report information, or a report information and at least one further report information, wherein the report information or the report information and the at least one further report information respectively comprise one or more identifiers and/or one more further identifiers of one or more beacon devices and a position information or a device identifier of a device that provided the report information and/or the at least one further report information;
  determining a position information associated with the report information and/or with the further report information in case the report information and/or the further report information do not comprise such a position information, wherein the position information is determined based at least partially on the device identifier and/or the further device identifier comprised by the obtained report information and/or the obtained further report information; and
  determining a position of at least one of the one or more beacon devices based at least partially on the one or more identifiers and/or the one or more further identifiers of the one or more beacon devices and the position information comprised by the obtained report information and/or by the obtained further report information and/or the determined position information.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first apparatus comprising at least one processor and at least one memory including computer program code, the at least one memory and the computer program code configured to, with the at least one processor, cause the first apparatus to at least perform:
   scanning for one or more signals sent by one or more beacon devices, wherein each signal of the one or more signals comprises an identifier of one beacon device of the one or more beacon devices, which has sent a signal of the one or more signals, wherein one or more identifiers of the one or more beacon devices are determined based on the one or more signals of the one or more beacon devices, wherein the scanning is performed for a duration of a time interval that is determined according to a pre-defined rule and that is at least partially based upon a speed associated with movement of at least one beacon device of the one or more beacon devices, and wherein the duration of the time interval is calibrated by iteratively increasing or decreasing the duration of the time interval depending on an accuracy of a determined position of at least one of the one or more beacon devices;
   obtaining a position information representing a position of the first apparatus; and
   outputting a report information comprising the determined one or more identifiers of the one or more beacon devices and the position information of the first apparatus to allow usage of the outputted report information to determine the position of the at least one of the one or more beacon devices.

2. The first apparatus according to claim 1, wherein the position information is obtained by determining the position of the first apparatus based at least partially on the scanned one or more signals of the one or more beacon devices and/or on a radio map.

3. The first apparatus according to claim 1, wherein the position information is obtained from a memory.

4. The first apparatus according to claim 1, the at least one memory and the computer program code configured to, with the at least one processor, cause the first apparatus further to perform:
   obtaining at least one further report information comprising one or more further identifiers identifying the one or more beacon devices, and a device identifier or a further position information of a device that provided the at least one further report information.

5. The first apparatus according to claim 4, the at least one memory and the computer program code configured to, with the at least one processor, cause the first apparatus further to perform in case the at least one further report information does not comprise the further position information:
   determining a position information for the device that provided the at least one further report information based at least partially on the device identifier.

6. The first apparatus according to claim 5, the at least one memory and the computer program code configured to, with the at least one processor, cause the first apparatus further to perform:
   determining the position of the at least one of the one or more beacon devices based at least partially on the one or more identifiers and/or the one or more further identifiers of the one or more beacon devices and the position information representing the position of the first apparatus and/or the position information of the device that provided the at least one further report information.

7. The first apparatus according to claim 1, wherein the time interval is also determined based on a function of a frequency at which the one or more signals of the one or more beacon devices are sent.

8. The first apparatus according to claim 1, wherein one or more received signal strength values are determined based on the one or more signals of the one or more beacon devices, wherein the report information to be outputted and/or obtained report information comprises the one or more determined received signal strength value.

9. The first apparatus according to claim 8, the at least one memory and the computer program code configured to, with the at least one processor, cause the first apparatus further to perform:

determining one or more reciprocal received signal strength values based on the one or more received signal strength values, wherein each reciprocal received signal strength value of the determined one or more reciprocal received signal strength values is indicative of a received signal strength value observable at the position of at least one of the one or more beacon devices; and wherein the position of at least one of the one or more beacon devices is determined further based on the one or more reciprocal received signal strength values.

10. The first apparatus according to claim 1, wherein each identifier of the one or more identifier and/or each further identifier of one or more further identifiers of the one or more beacon devices is a MAC address and/or the first apparatus is identified based on a MAC address and/or the device identifier of the device that provided at least one further report information is a MAC-address.

11. The first apparatus according to claim 1, wherein the first apparatus is a gateway device capable of performing and/or controlling the method according to claim 1.

12. A second apparatus comprising at least one processor and at least one memory including computer program code, the at least one memory and the computer program code configured to, with the at least one processor, cause the second apparatus to at least perform:

obtaining a report information, or a report information and at least one further report information, wherein the report information or the report information and the at least one further report information respectively comprise one or more identifiers and/or one more further identifiers of one or more beacon devices and a position information or a device identifier of a device that provided the report information and/or the at least one further report information, wherein obtaining the report information, or the report information and at least one further report information, comprises obtaining the report information, or the report information and at least one further report information, from a plurality of devices with the report information, or the report information and at least one further report information, having been collected during a same time interval having a duration that was calibrated by iteratively increasing or decreasing the duration of the time interval depending on an accuracy of a determined position of at least one of the one or more beacon devices;

determining the position information associated with the report information and/or with the further report information in case the report information and/or the further report information do not comprise such position information, wherein the position information is determined based at least partially on the device identifier and/or the further device identifier comprised by the obtained report information and/or the obtained further report information; and determining a position of at least one of the one or more beacon devices based at least partially on the one or more identifiers and/or the one or more further identifiers of the one or more beacon devices and the position information comprised by the obtained report information and/or by the obtained further report information and/or the determined position information, wherein determining the position of the at least one of the one or more beacon devices comprises determining the position of the at least one of the one or more beacon devices based on the report information, or the report information and at least one further report information, from the plurality of devices that was collected during the same time interval and that includes the identifier of the at least one of the one or more beacon devices.

13. The second apparatus according to claim 12, wherein the time interval is determined based on a function of a frequency at which one or more signals of the one or more beacon devices are sent and a speed associated with movement of the at least one beacon device of the one or more beacon devices whose position is to be determined.

14. The second apparatus according to claim 12, wherein the position information is obtained by determining a position of a first apparatus based at least partially on the scanned one or more signals of the one or more beacon devices based on a triangular direction finding and/or on a radio map.

15. The second apparatus according to claim 12, wherein the position information is obtained from a memory.

16. The second apparatus according to claim 12, wherein one or more received signal strength values are comprised by the report information and/or the at least one further report information.

17. The second apparatus according to claim 16, the at least one memory and the computer program code configured to, with the at least one processor, cause the second apparatus further to perform:

determining one or more reciprocal received signal strength values based on the one or more received signal strength values, wherein each reciprocal received signal strength value of the determined one or more reciprocal received signal strength values is indicative of a received signal strength value observable at the position of at least one of the one or more beacon devices; and wherein the position of at least one of the one or more beacon devices is determined further based on the one or more reciprocal received signal strength values.

18. The second apparatus according to claim 12, wherein each identifier of the one or more identifier and/or each further identifier of the one or more further identifiers of the one or more beacon devices is a MAC address and/or a first apparatus is identified based on a MAC address and/or the device identifier of the device that provided the at least one further report information is a MAC-address.

19. The second apparatus according to claim 12, the at least one memory and the computer program code configured to, with the at least one processor, cause the second apparatus further to perform:

outputting the determined position of the at least one of the one or more beacon devices.

20. The second apparatus according to claim 12, wherein the second apparatus is a server providing positioning services and/or radio maps for enabling positioning services.

21. The second apparatus according to claim 12 wherein the device that provided the report information and/or the at least one further report information comprises a gateway device.

* * * * *